United States Patent [19]

McAllister

[11] Patent Number: 4,778,078
[45] Date of Patent: Oct. 18, 1988

[54] VACUUM INSULATED SHIPPING CONTAINER AND METHOD

[75] Inventor: Ian R. McAllister, Vancouver, Canada

[73] Assignee: Danby Developments, Inc., Vancouver, Canada

[21] Appl. No.: 20,780

[22] Filed: Mar. 2, 1987

Related U.S. Application Data

[63] Continuation-in-part of Ser. No. 821,381, Jan. 21, 1986, Pat. No. 4,646,934.

[51] Int. Cl.[4] ............................................. B65D 25/04
[52] U.S. Cl. ..................................... 220/420; 220/83; 220/468; 206/524.8
[58] Field of Search ............... 220/420, 425, 435, 466, 220/468, 83, 5 A, 84, 1.5, 901; 206/524.8

[56] References Cited

U.S. PATENT DOCUMENTS

| | | |
|---|---|---|
| 1,337,278 | 4/1920 | Schulz . |
| 1,413,169 | 4/1922 | Lawton . |
| 1,420,711 | 6/1922 | Knutson . |
| 2,260,393 | 10/1941 | McCarthy ....................... 220/468 X |
| 2,451,486 | 9/1944 | Horton . |
| 2,633,264 | 3/1953 | Dinsmore et al. . |
| 2,702,458 | 2/1955 | Del Mar . |
| 2,786,342 | 3/1954 | Goetz . |
| 2,960,249 | 11/1960 | Walsh . |
| 3,064,770 | 11/1962 | Andrews ......................... 220/5 A X |
| 3,370,740 | 2/1968 | Anderson . |
| 3,395,824 | 8/1968 | Gerhard .......................... 220/5 A X |
| 3,782,128 | 1/1974 | Hampton et al. ................ 220/901 X |
| 4,050,605 | 9/1977 | Wakana et al. .................... 220/83 X |
| 4,193,510 | 3/1980 | Weston ............................. 220/83 X |
| 4,343,413 | 8/1988 | Chatzipetros et al. . |
| 4,448,041 | 5/1984 | Southworth, Jr. . |
| 4,646,934 | 3/1987 | McAllister ......................... 220/420 |

FOREIGN PATENT DOCUMENTS

2158214A 11/1985 United Kingdom .

Primary Examiner—Steven M. Pollard
Attorney, Agent, or Firm—Hughes, Cassidy & Multer

[57] ABSTRACT

An insulated vacuum container comprising inner and outer wall sections, with each wall section made up of a skeletal frame, with membranes enclosing each frame. The membranes of the outer wall section curve inwardly, while the membranes of the inner section curve outwardly. The pressure loads imparted on the membranes are reacted substantially entirely in tension onto the skeletal frames. There is a rear end wall, mounted so as to be movable longitudinally relative to the outer wall section so as to permit thermal contraction and expansion of the inner wall section relative to the outer wall section.

26 Claims, 5 Drawing Sheets

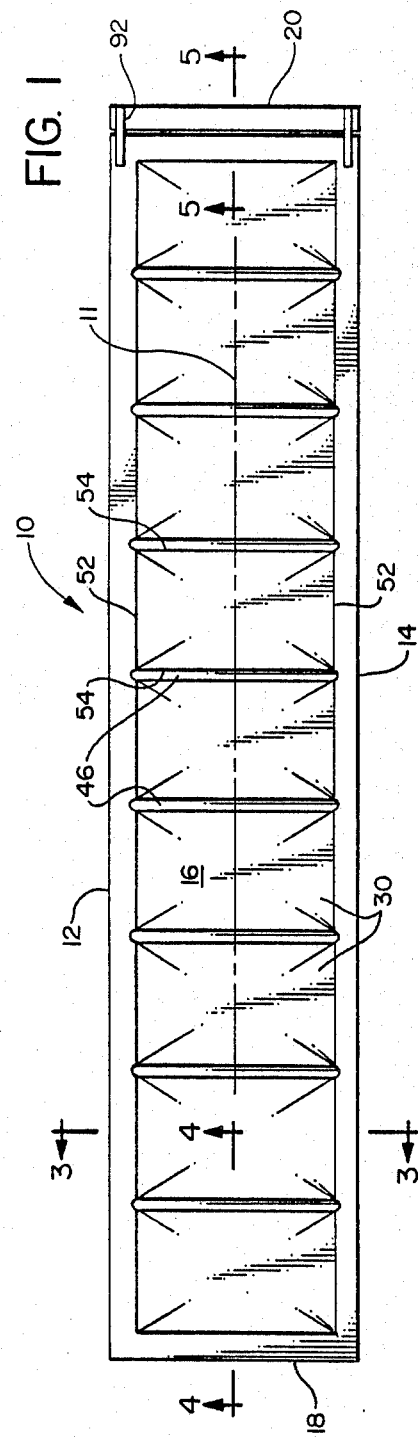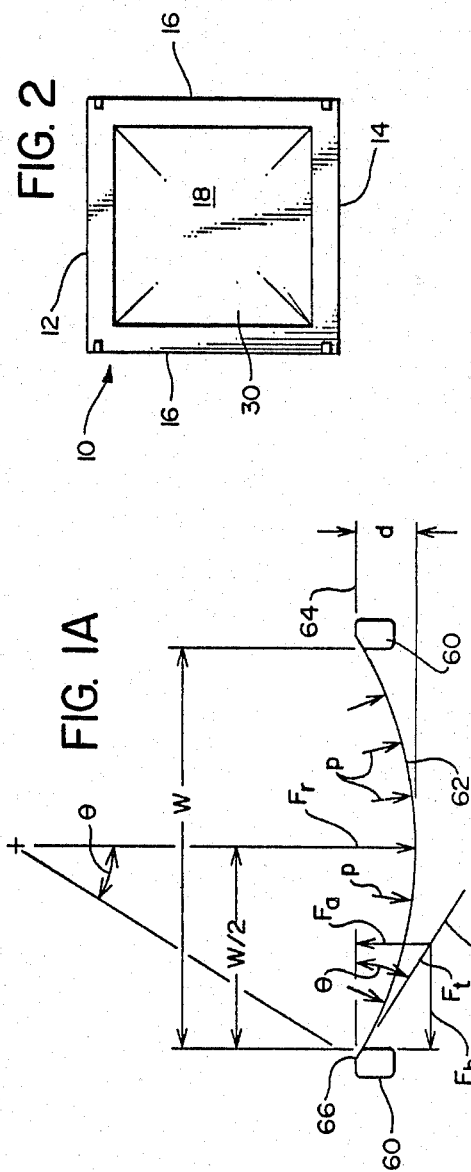

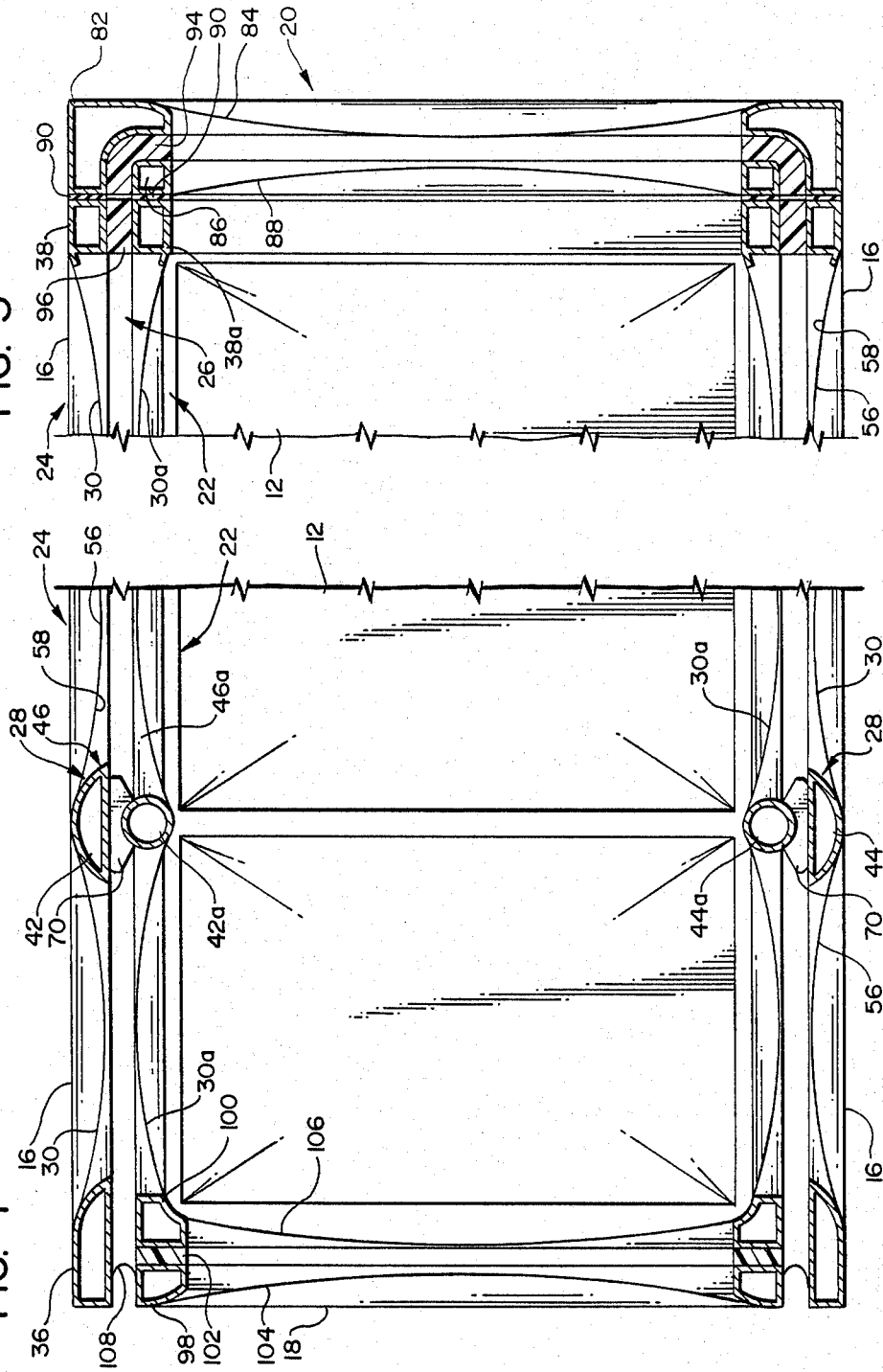

VACUUM INSULATED SHIPPING CONTAINER AND METHOD

BACKGROUND OF THE INVENTION

1. Field of the Invention

The present invention relates to vacuum insulated containers, and more particularly to such containers adapted for use in shipping products, such as products which must be kept at very low temperatures for relatively long periods of time.

One of the common uses of insulated cargo containers is for the shipment of frozen food stuff. Such containers can be designed to produce temperatures below 0° F. However, with age, quite commonly deterioration of the insulation and also of the refrigeration equipment occurs, this resulting in reduction of the subzero capabilities of such containers. Even though the operators who use such insulated cargo containers attempt to maintain a high quality of service, the cost of doing so has been continuously increasing over the years. Further, in many instances, maintaining the temperature of food stuffs at approximately 0° F. is not optimum for food quality maintenance.

It has been known for years that the fast freezing of food stuffs, such as fruits, vegetables, fish and other commodities, using cryogenic fluids such as liquid nitrogen can result in a superior market product. While these techniques have been used and automated equipment has been developed to perform the freezing operation, the problem of shipping at quite low temperatures (i.e. near −80° F.) has been a very difficult one to solve. Thus, though the near 0° F. shipping temperatures are not optimum for food quality maintenance, for the large part, shipping containers having the capability to be used only for shipment at temperatures at about 0° F. are the current state of the art.

It has long been known that excellent insulating capability can be obtained by providing a vacuum between two members, a common device utilizing this principle being the vacuum flask. Such a flask is made up of inner and outer walls which are spaced from one another, with a vacuum being provided in the space between the two walls. Quite commonly the two walls are formed as concentric cylindrical side wall sections, with the ends of the cylinders being closed by concentric hemispherical sections. An opening is provided through one of the end hemispherical sections.

However, the walls of the vacuum flask are subjected to rather substantial forces. With atmospheric pressure being approximately 15 pounds per square inch (psi) at sea level, the outside wall of a 3 inch diameter by 12 inch long standard vacuum bottle is subjected to a total lateral force of as much as 540 pounds. The internal wall of the flask does not require as heavy a wall, since the internal forces are directed radially outwardly, so that the material forming the inner wall is in tension, with there being no buckling tendency. However, the outer wall experiences what can be described as a crushing force, and the outer wall must be structurally stronger to withstand the forces which would tend to buckle the outer wall.

Because of the structural problems of providing a vacuum insulating container, in many instances the thought of using the evacuated area as insulation is abandoned, and thick high quality insulation is used. However, to maintain quite low temperatures for long periods of time, even the use of quite thick, high quality insulation is not satisfactory.

Another consideration is that in any shipping container, the volume occupied by the container is an important consideration. Desirably, the total volume occupied by the container should not be too much greater than the volume of the product contained. Further, it is desirable that the configuration of the shipping container be such so that the loading of the containers into, for example, a truck or a freight car, can be accomplished as economically as possible, with the optimum use of space.

SUMMARY OF THE INVENTION

The present invention is closely related to U.S. patent application Ser. No. 821,381, filed January 21, 1986, and entitled "VACUUM INSULATED SHIPPING CONTAINER AND METHOD", with the inventor being the same as in the present invention.

In the earlier patent application, there is described a container comprising a fluid tight outer containing structure comprising first outer wall means adapted to be exposed to ambient pressure, and also a fluid tight inner containing structure defining a product containing area and having a second wall means spaced inwardly from the first wall means. The first and second wall means define therebetween a substantially evacuated insulating area to insulate the containing area from ambient heat transfer. Each of the wall means comprises a frame on which membrane actions are mounted.

In that earlier application, it was recognized that due to varying temperature differentials between the inner and outer wall means, there will be relative movement therebetween due to thermal expansion and contraction. To compensate for such expansion and contraction, the forward end of the container was arranged to permit relative longitudinal movement between the forward perimeter frames of the inner and outer wall means. While the structure defined in that earlier application is fully capable of achieving the objects of that invention, the inventor of that original application has made further developments relating to the arrangement of the structure to accomodate the thermal expansion and/or contraction of the components. It is toward this that the present invention is directed.

In the present invention, there is a vacuum insulated container defining a containing area and having a longitudinal axis, a front end and a rear end. This container comprises a first fluid tight outer side wall structure adapted to be exposed to ambient atmosphere. There is a second fluid tight inner side wall structure spaced inwardly from the outer side wall structure and defining the containing area. The first and second side wall structures define therebetween a substantially evacuated insulating area to insulate the containing area from ambient heat transfer.

There is a fluid tight rear end wall section comprising a rear outer wall section and a rear inner wall section which define therebetween a second substantially evacuated area. At least the inner rear wall section is connected to a rear end of the second inner wall structure so as to be movable therewith. The rear end of the second inner wall structure and the inner rear wall section are mounted so as to be movable along the longitudinal axis relative to the outer side wall structure in a manner that differential thermal expansion and contraction of the first outer side wall structure and the second inner wall structure are permitted through movement of the rear end of the second side wall structure and the rear inner wall section relative to the first outer side wall structure.

In a preferred embodiment, the rear outer wall section is also connected to the rear end of the second inner side wall structure so as to be movable therewith. Further, in this preferred embodiment, the rear outer wall section comprises a rear outer perimeter frame which is mounted to a rear perimeter frame of the first outer side wall structure and which is connected to the perimeter frame of the first outer side wall structure through a fluid tight seal which permits movement of the outer rear perimeter frame of the rear outer wall section relative to the rear perimeter frame of the first outer side wall structure. More specifically, in the preferred embodiment, the rear outer wall section comprises a rear outer perimeter frame defining a rear outer wall section area. There is a generally planar outer rear membrane section extending across said outer rear side wall section area and having a main central portion and a perimeter portion attached to the rear outer perimeter frame. The main central portion of the outer rear membrane section has a configuration, relative to the rear outer perimeter frame, of an inwardly curved plane, such that ambient pressure acting against an outer surface of said rear outer membrane section causes said rear outer membrane section to act substantially entirely in tension to withstand the ambient pressure.

Further, in the preferred embodiment, the rear inner wall section comprises an inner rear perimeter frame defining a rear inner wall section area. A generally planar inner rear frame membrane section is mounted to the inner rear perimeter frame in a manner similar to the outer rear membrane section, except that the inner rear membrane section curves outwardly in response to tension loads thereon.

In another embodiment, the rear end of the outer wall structure comprises a rear perimeter frame to which the outer membrane section is mounted, generally in the manner described above. The rear inner wall section is as described above, in that the rear inner wall section is connected to the rear portion of the inner side wall structure so as to be movable therewith. However, it is movable relative to the rear outer wall section.

In the preferred form, at least the outer side wall structure comprises a plurality of side wall sections, each having at least one perimeter frame with a membrane section mounted thereto as described above. Also in the preferred form, the inner side wall structure is similarly constructed, but with each membrane section curved outwardly.

Further, in the preferred embodiment, the outer containing structure comprises a support frame having a plurality of longitudinally extending corner beams and a plurality of cross beams. In the further preferred embodiment, the inner side wall structure is similarly constructed. The forward ends of the inner and outer frames of the outer and inner side wall structures are rigidly innerconnected, with thermal expansion taking place by the rear portion of the inner side wall structure moving relative to the rear portion of the outer side wall structure.

Other features of the present invention will become apparent from the following detailed description.

BRIEF DESCRIPTION OF THE DRAWING

FIG. 1 is a side elevational view of a first embodiment of a container embodying teachings of the present invention;

FIG. 1A is a schematic drawing illustrating the manner in which pressure forces are reacted into the membrane section and frame portion of the container of the present invention;

FIG. 2 is an end view of the container of FIG. 1, looking at a rear closure portion of the container;

FIG. 4 is a sectional view taken along line 4—4 of FIG. 1;

FIG. 5 is a sectional view taken along line 5—5 of FIG. 1, and illustrating the configuration of the front end cover;

DESCRIPTION OF THE PREFERRED EMBODIMENTS

Figure 3:
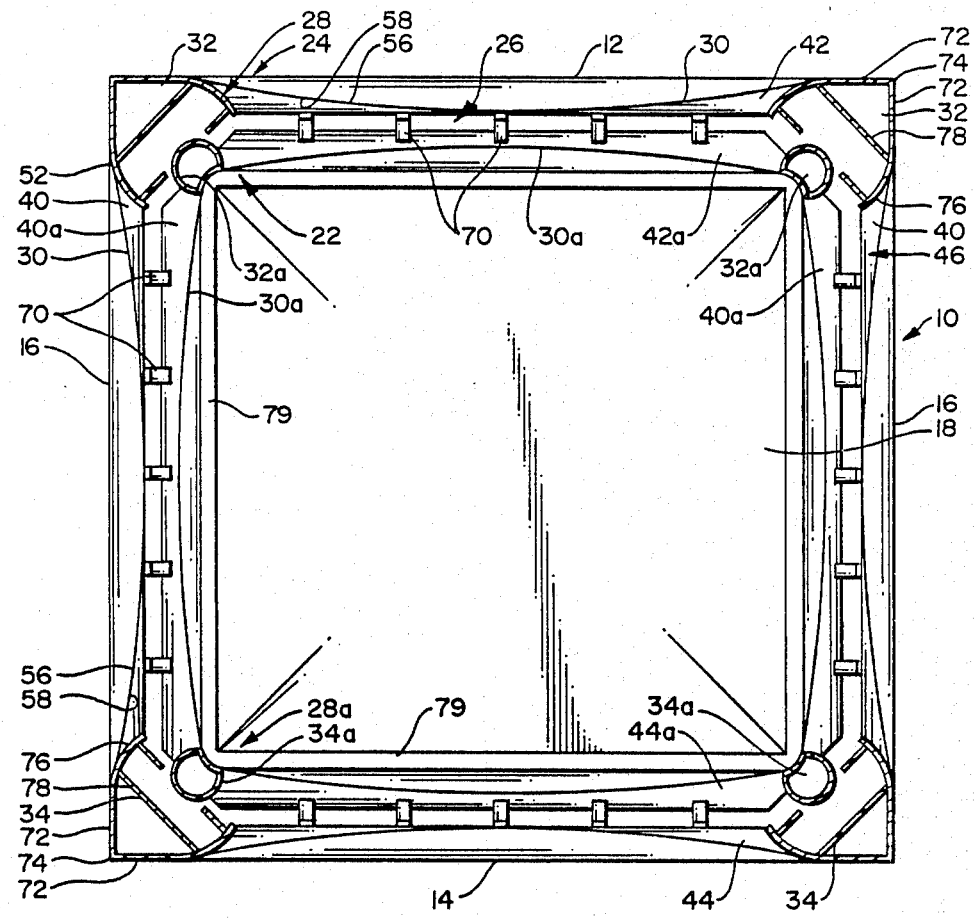
FIG. 3 is a transverse sectional view taken along line 3—3 of FIG. 1.

Much of the basic structure of the present invention is disclosed in my pending U.S. patent application Ser. No. 821,381, filed January 21, 1986, and the benefit of the filing date is claimed for the subject shown in that application. In the first part of this text there will be a description of the components of the present invention which are the same as, or closely similar to, those shown in U.S. application Ser. No. 821,381, after which the features which are newly disclosed in this application will be discussed.

A first embodiment of the present invention is illustrated in FIGS. 1-5, which show a container 10 shaped as a rectangular prism having a square cross-sectional area, and having a longitudinal center axis 11. In terms of configuration, the container 10 comprises a top wall 12, a bottom wall 14, two side walls 16, an end wall 18, and a removable end cover 20 positioned at an end of the container 10 opposite to the location of the end wall 18. The end of the container 10 adjacent the cover 20 shall be considered the forward end of the container 10, while the location proximate to the end wall 18 will be considered the rear of the container 10.

In terms of structure, the container 10 can be considered as having an inner side wall structure 22 and an outer side wall structure 24 substantially surrounding the inner side wall structure 22 and spaced a short distance outwardly therefrom so as to define with the inner side wall structure 22 an evacuated insulating area, generally designated 26.

The outer side wall structure 24 comprises a skeletal frame 28 which is covered by a plurality of sheet sections or membrane sections 30. In the particular configuration shown herein, the frame 28 comprises two upper longitudinal beams 32, located at the juncture lines of the side walls 16 and the top wall 12 and two lower longitudinal beams 34 located at the juncture lines of the two side walls 16 with the bottom wall 14.

In addition, there are four rear end beams 36 located adjacent to the edges of the end wall 18, and a second set of front end beams 38 interconnected in a square configuration at the location of the cover 20, so that two of these second end beams 38 are positioned at the front edges of the side walls 16, while the other two second end beams 38 are positioned at the front edges of the top wall 12 and bottom wall 14, respectively.

Extending between each upper longitudinal beam 32 and a related lower longitudinal beam 34 positioned immediately below, there are a plurality of evenly spaced vertical intermediate beams 40. In like manner, there are a plurality of upper intermediate beams 42 extending horizontally between the two upper beams 32, and a plurality of lower intermediate beams 44 extending horizontally between the two lower longitudinal beams 34.

Thus, it can be seen that the beams 32–44 collectively define a plurality of interconnected rectangular frame sections 46. For example, a pair of adjacent vertical intermediate beams 40 form with those portions of the upper and lower longitudinal beams 32 and 34 that extend therebetween a rectangular frame section.

Each of the frame sections 46 has a related membrane section 30 having two edges 52 which join to the longitudinal beams 32 and/or 34, and two second edges 54 which join to the intermediate beams 40 or the beams 36 or 38. The membrane sections 30 are made fluid tight so as to be impervious to the passage of air, and the membrane edges 52 and 54 are joined to their respective beam members to make a fluid tight connection.

As indicated earlier, the area 26 between the outer and inner side wall structures 22 and 24 is evacuated. With the outer surface 56 of each of the membrane sections 30 being exposed to ambient atmosphere, and with the inside surface 58 of each membrane 30 facing a vacuum, it is readily apparent that atmospheric pressure acting upon the membrane 30 creates a substantial force tending to push the membrane 30 inwardly toward the interior of the container 10. As will be discussed more fully hereinafter, each of the membranes 30 is arranged so that these rather substantial force loads are reacted substantially entirely in tension along lines of force parallel to the curved plane of the membrane 30. This causes the outer surface 56 of each membrane 30 to assume a moderately concave curvature.

Each membrane 30 can, for purposes of description, be considered as having a locating plane which is coincident with the perimeter of the membrane (i.e. the edges 52 and 54) where the membrane 30 joins to its related perimeter frame. Then the membrane can be considered as actually being positioned in a curved plane which meets the locating plane at the edge locations 52 and 54, but which curves away from the locating plane.

It is believed that a better understanding of the description which is to follow will be achieved by at this time providing a simple analysis of the nature and effect of the tension loads exerted on each membrane 30, and reference is now made to FIG. 1A, which is a rather simplified diagram showing two beams 60 of theoretically infinite length, with a membrane 62 extending between the two beams 60, with this membrane 62 also being of infinite length. In this example, we shall assume that the beams 60 will not deflect under loading, and that the membrane 62 does not elongate under tension loads.

In this example, the width dimension of the membrane (i.e. the distance between the two beams 60) is designated "w". The atmospheric pressure exerted against the outer surface of the membrane 62 is indicated by a multiplicity of small arrows "p", and the resultant force of this pressure is indicated at "Fr". It is assumed that the membrane 62 is constructed, relative to the spacing of the beams 60, so that the middle portion of the membrane 62 will deflect a distance "d" from the plane extending between the beams 60 at the juncture point of the membrane 62.

This force Fr is reacted totally in tension in the membrane 62. To calculate the tension force exerted on the membrane 62, a line is drawn tangent to the membrane 62 at the juncture point 66 where the membrane 62 joins to the beam 60, this tangent line being designated 68. The angle being made by the line 68 with the line or plane 64 is designated by $\theta$, and the tension force at the point of tangency 66 is designated "Ft". The force Ft can be divided into two force components, namely "Fa", directed oppositely to the force Fr, and a second force component designated "Fb", extending perpendicular to the force component Fa. It can readily be appreciated that as the angle $\theta$ decreases, the resultant tension force Ft on the membrane 62 will increase. As an example, let it be assumed that the angle $\theta$ was 10°. The tension force Ft would be equal to Fa (which would be equal to Fr times the cosecant of $\theta$). With the cosecant of 10° being approximately 5.7, the tension force Ft would be 5.7 times the resultant force Fr.

Another consideration is the amount of deflection which the membrane undergoes. For a given width w, the amount of deflection d can be calculated according to the following formula:

$$d = w/2 \, (\csc \theta - \cot \theta)$$

For an angle $\theta$ of 10°, this deflection d will be about 0.09 w.

For relatively small angles of 0 i.e. 10° or less, the tension force exerted on the membrane 62 would be nearly directly inversely proportional to the magnitude of the angle $\theta$. On the other hand, the deflection d of the membrane 62 would be substantially directly proportional to the angle $\theta$. It is, of course, desirable to keep the amount of deflection d as small as possible to keep the containing volume of the container 10 as great as possible relative to the total volume occupied by the container 10. On the other hand, there is a practical lower limit to which the deflection d can be lowered, before the stress on the membrane 62 and the beams 60 becomes so excessive that the bulk and weight of the beams 60 and membranes 62 are unrealistically high.

With the foregoing in mind, we will now continue with a description of the structure of the container 10. The skeletal frame of the inner structure corresponds almost exactly to that of the outer structure. Accordingly, for ease of description, the beams of the inner structure which correspond to beams of the outer structure will be given like numerical designations, with an "a" suffix distinguishing the beams of the inner structure 24. Thus, the inner structure 24 has a skeletal frame 28a made up of the upper and lower longitudinal beams 32a and 34a, beams 36a and 38a, and also intermediate beams 40a–44a.

Likewise, there are a plurality of membrane sections 30a extending between the various frame sections 46a provided by the interior skeletal frame 28a. However, while the interior membrane sections 30a are also placed in tension, the pressure is exerted against the membrane sections 30a from the interior of the container 10 thus causing the membrane sections 30a to curve outwardly toward their corresponding outer membrane sections 30. The analysis presented above relative to the membrane 30 applies as well to the membranes 30a.

It is necessary to provide interconnecting support members between the outer and inner skeletal frames 28 and 28a. However, these interconnecting supports should be made in a manner to mimimize the heat conductive path made by such interconnecting structures. This can be done in three ways. First, the interconnecting structure should be made of a material which has low heat conductivity. Second, the structure should be arranged so that its conductive path is as long as possible. Third, the interconnecting structures should have a cross-sectional area along the heat conductive path to be as small as possible. Further, it should be recognized that while each of the skeletal structures 28 and 28a are subjected to very high loads due to the pressures exerted by the ambient atmosphere and the atmosphere or liquid contained within the container 10, the interconnecting structure between the frames 28 and 28a need only be strong enough to support the weight of the inner structure 24 plus the contained material, and also to withstand any impact loads to which the container 10 might be subjected. Further, as will be discussed more fully later herein, the interconnecting structure should be such as to permit limited relative movement between frames 28 and 28a to allow for thermal expansion and contraction, and particularly along the lengthwise axis 11.

The interconnecting elements are shown only schematically herein, and these are simply given the numerical designation 70, it being understood that the interconnecting structure could be structural components already known in the prior art. These interconnecting elements 70 are located at spaced locations along the length of the various pairs of adjacent beams 40-40a, 42-42a and 44-44a. Since the opposed side beams are subjected to bending moments which tend to move the beams together, the elements 70 tend to cancel these bending moments out. Also the elements 70 should be such as to permit some relative movement between the frames 28 and 28a due to thermal expansion and contraction.

In the particular configuration as shown herein, the upper and lower longitudinal beams 32 and 34 are substantially identical, and these comprise a pair of plates 72 which meet at a right angle corner 74, with the opposite ends of the plates curving inwardly, as at 76. Reinforcing webs 78 can be provided. The membrane sections 30 can be joined to the beams 32 and 34 by use of conventional bonding techniques, and the edges 52 of the membrane sections 30 can be joined to the beams 32 or 34 at the location of the curve 76 to minimize any localized stresses.

It is to be understood that outer and inner floor and-/or wall structures can be provided for the container 10. Such an inner structure is shown at 79 in FIG. 3.

The components described above are the same as, or closely similar to, those shown in the above-mentioned U.S. patent application Ser. No. 821,381. The components which are described hereafter will differ in various respects from corresponding components shown in the prior patent application.

The cover 20 is made in a manner to incorpote the same structural principles as those of the outer and inner structures 22 and 24 of the main container 10. As shown herein, the cover 20 has an outer skeletal frame 82 of a square configuration supporting an outer membrane section 84 which, as described previously, is loaded in tension, so as to have a generally concave configuration. There is an inner frame 86 having an inner membrane section 88. The cover member 20 and the forward edge portion of the container 10 are formed with suitable seals which are or may be conventional in the art. Accordingly, this seal structure is simply indicated somewhat schematically and generally designated 90. Further, when the cover 20 is in place at the end of container 10, suitable fastening devices, such as shown at 92 in FIG. 1 can be provided to hold the cover 20 in place. The two frames 82 and 86 are rigidly connected to one another through a suitable fluid tight insulating connecting device which is simply indicated schematically at 94. As indicated previously, it is to be understood that the connecting device 94 could take a variety of forms, and could be similar to the connecting devices or spacers indicated schematically at 70.

With regard to the front edge portion of the main container 10, the two front end frames sections 38 and 38a are connected rigidly to one another by means of a suitable fluid tight insulating connection, indicated schmatically at 96. This is done in a manner that the two front end frame members 38 and 38a are rigidly interconnected with one another.

The configuration of the rear end wall 18 is considered to be significant in the present invention, and this will be described with reference to FIG. 4. There is an outer perimeter frame 98 having a square configuration, and an inner perimeter frame 100 spaced a short distance forwardly of the frame 98. There is a suitable insulating connecting device 102 by which the two frames 98 and 100 can be fixedly connected to one another. As indicated previously, this insulating connector 102 is simply shown schematically herein, and various such connecting devices could be used.

There are outer and inner membranes 104 and 106, respectively, and these are connected to, respectively, the outer and inner frames 98 and 100. The same structural principals as those utilized in the outer and inner structures 22 and 24 and those used in the door 20 are utilized in the rear wall 18, in that the membranes 104 and 106 define therebetween an insulated evacuated area, and the membranes 104 and 106 withstand the pressure loads from ambient atmosphere and the fluid medium (i.e. air or some other medium) within the container by reacting substantially in tension.

The outer frame 98 is connected to the rear end frame 36 of the outer structure 22 by means of a fluid tight flexible seal 108 which permits relative movement between the rear wall 18 and the frame 36 forwardly and rearwardly. Also, it is to be recognized that the seal 108 provides sufficient structural support between the frames 36 and 98 so that the rear wall 18 is properly centered relative to the frame 36. Alternatively, suitable spacers could be placed between the frames 36 and either or both of frames 98 and 100, with a non load bearing seal. To describe the operation of the present invention, let it be assumed that the container 10 is to be used to ship a product, such as a frozen food product, at very low temperatures (e.g. $-80°$ F.). The product can be brought to the desired low temperature by use of conventional means, such as exposure to a cryogenic fluid, and the product then placed in the container 10. In some instances, a quantity of cryogenic fluid (e.g. liquid nitrogen) can be placed inside the container 10 for extending its low temperature condition, with the evaporated fluid being vented from time to time to prevent an undue buildup of pressure.

As indicated previously, the area 26 between the outer and inner structures 22 and 24 is evacuated, with the result that the outer membrane sections 30 are exposed to ambient pressure (14.7 psi at sea level), while the inner membrane sections 30a can be expected to be subjected to pressures at least as high as ambient atmospheric pressure, and possibly somewhat greater if a cryogenic fluid within the container 10 is evaporating. Also, the area between the membrane sections 84 and 88 of the cover 20 and the area between the membranes 104 and 106 of the rear wall 18 are likewise evacuated.

Let us turn our attention first to the forces exerted by the outer membrane sections 30 on the outer skeletal frame 28. First, with regard to the upper and lower longitudinal beams 32 and 34, the side membrane sections 30 would exert a force on its related upper longitudinal beam 32 which is parallel to that portion of the curved plane of the membrane at the point where it joins to the beam 32. This force would have an inward component, but the main force component would be directed vertically. In like manner, each of the top membrane sections 30 would be exerting primarily a laterally inward force on the two beams 32. The net force exerted on each of the upper beams 32 would be the resultant of the vertical and lateral forces exerted by the side and upper membrane sections 30, and with the upper and side membrane sections 30 being of substantially the same area, the resultant would be a downward and laterally inward force at about 45° from the horizontal. Similar forces would react on the lower longitudinal beams 34. These forces would be resisted by the intermediate beams 40, 42 and 44, which would be loaded in compression.

The membrane sections 30 would also be placing substantial tension forces on each of the intermediate beams 40, 42 and 44. However, it will be noted that the lateral force components of two adjacent membranes would essentially cancel each other out, so that the intermediate beams 40, 42 and 44 would be resisting primarily only the inwardly directed resultant force component. However, even this inward force component could be substantial. For example, if one of the membrane sections 30 had a height dimension of four feet and a width dimension of three feet, the total inwardly directed force component by ambient pressure at sea level would be approximately 150,000 pounds. This loading would be shared by a pair of adjacent intermediate beams 40, 42 or 44 and the sections of the longitudinal beams 32 and/or 34 extending therebetween. Further as indicated earlier herein, the spacing members 70 provide support between the inner and outer beans 40-44a, 42-42a and 44-44a.

The forces exerted on the four end beams 36 would be somewhat different than those exerted on the longitudinal beams 32, in that these end beams 36 would resist the forces exerted by membrane sections 30 by providing a resisting force opposite to the tension forces exerted by the adjacent membrane 30, which tension forces would be generally parallel to the plane of the membrane where it connects to the beam 36.

As indicated previously, from a standpoint of maximizing the effective storage space within the container 10, relative to the total volume occupied by the container, the deflection of the membranes 30-30a (which is related to the curvature) should be kept to a minimum. However, the stress on the membranes 30-30a and the beams supporting these membranes increases as the curvature and deflection of the membranes 30-30a decrease. To illustrate these relationships, reference is made to FIGS. 6 and 7.

Figure 6:
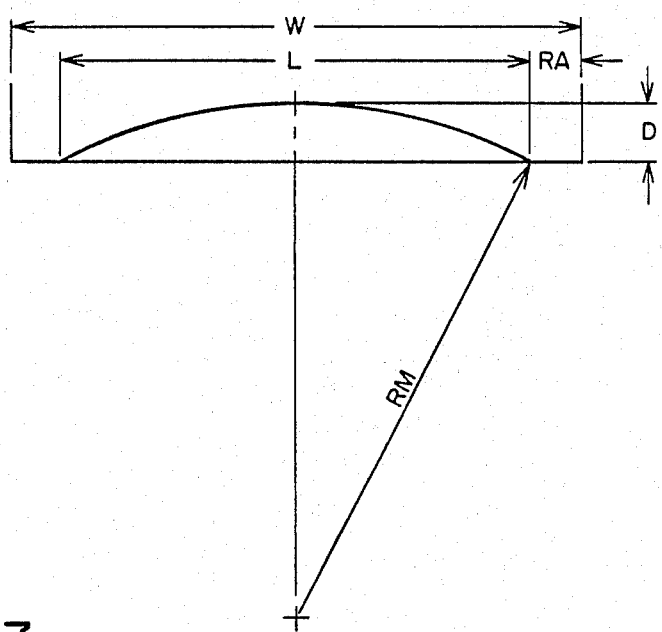
FIG. 6 is a highly schematic view illustrating a curved membrane section mounted to a pair of beams, indicating certain dimensional relationships which are utilized in an analysis of the effects created by varying the deflection of the membrane section.

FIG. 6 illustrates a somewhat idealized and highly schematic illustration of a configuration of a single outer frame section. The dimension "W" is the total lateral dimension of the container, which is presumed to be 90 inches. It is assumed that the corner beams (such as described previously and indicated at 32 and 34) would occupy a certain amount of space, and it is assumed that the dimension "RA" is equivalent to the corner beam width, which is presumed to be 8 inches for each beam. Thus, the lateral dimension of the curved portion of the membrane (identified at "L" in FIG. 6) is 74 inches. The radius of curvature (indicated at "RM" of the membrane) will vary in accordance with the amount of deflection of the membrane (indicated at "D"). In this idealized example, it is assumed that the deflection "D" varies between 1 to 10 inches. For these deflections, the tensile force resulting from the force of atmospheric pressure on a single one inch width of the membrane has been calculated. A table presenting the various information and the calculations is presented at the end of the text of this specification.

Figure 7:
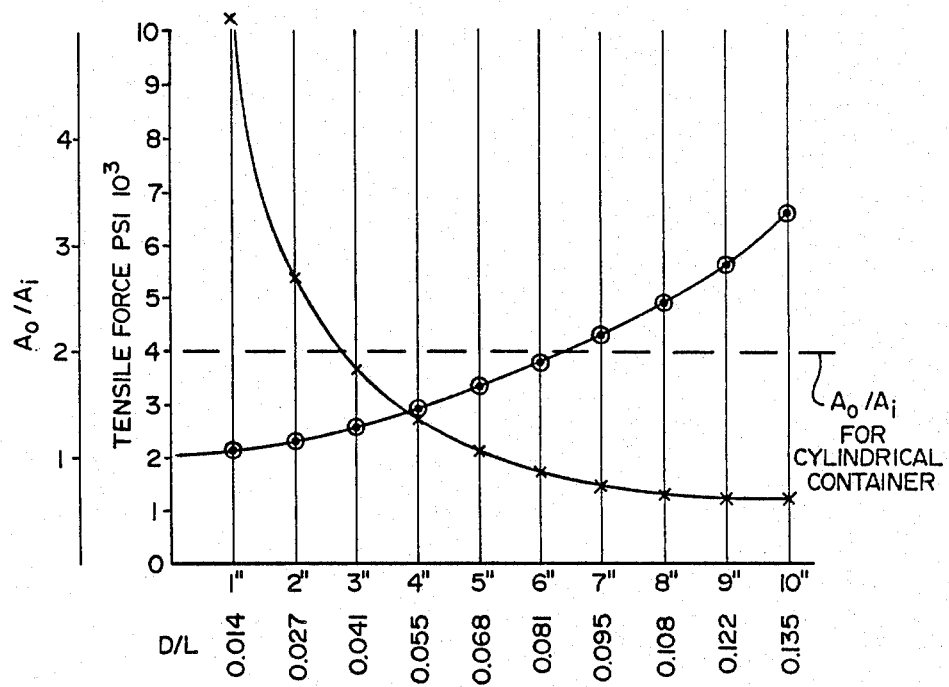
FIG. 7 is a graph illustrating certain relationships resulting from varying the deflection of a membrane section.

To illustrate these relationships, reference is now made to the graph of FIG. 7. On the horizontal axis, there is presented the deflection "D" in inches, and there is also presented the values of "D/L". On the vertical axis, there is presented the tensile force on each one inch strip of the membrane for the various deflections, and there is also presented the ratio of the outside volume of the container to the inside volume of the container (Ao/Ai). In this idealized example, it is assumed that the thickness dimension of the membranes is zero, and that the spacing between each pair of inner and outer membranes at the maximum point of deflection is also zero. Also, it is assumed that the length of the container is infinite, so that no allowances would have to be made for loss of volume by the presence of an end wall. Also, to simplify calculations, it was assumed that the inside area would be a square area.

As can be seen in FIG. 7, as the deflections become quite small (in the order of one to two inches, which is D/L of 0.014 to 0.027, the force exerted on the membranes (and consequently the total force exerted on the frame structure) increases dramatically. On the other hand, for greater deflections (from 510 inches, which is D/L of 0.068 to 0.135), the decrease in the tensile force on the membranes relative to the increase of deflection is substantially less. Also, it can be seen that for very small deflections, the Ao/Ai ratio does not increase significantly. However, as the deflections become greater, this area ratio (which is directly related to the volume ratio of the container for this theoretical container of infinite length) increases at a much greater rate for each increment of deflection.

To draw a comparison between these relationships and a cylindrical vacuum container, let it be assumed that there is a cylindrical vacuum container of infinite length, and that its wall thicknesses are zero, with the space between these walls also being zero. Further, since most cargo is contained in square containers, and since there must be a floor within the cylindrical vacuum container, we shall assume that the containing area is a square fitting within the limits of the circle defined by the cylindrical vacuum container. Further, since these various cylindrical vacuum containers must be contained in a larger shipping container of rectangular configuration (e.g. a trailer or a freight car), we shall consider the effective outside area of the cylindrical container to be equal to a square, where each side of the square is equal to the diameter of a cylindrical container. Under these idealized conditions, it can be seen that the Ao/Ai ratio of this idealized cylindrical container is two. Thus, by plotting this value on the graph of FIG. 7, it can be seen that where the deflection of the container of the example of FIG. 6 is six inches or less, the Ao/Ai ratio of the container of the present invention is less than (and therefore better than) that ratio for the cylindrical container. On the other hand, for a deflection of seven inches or greater, the Ao/Ai ratio of the container of the present invention is greater than (and thus poorer than) the ratio for the cylindrical container).

It is to be emphasized that these relationships are presented in a rather theoretical fashion, primarily to illustrate the relationships. In actually designing the container of the present invention, consideration must be given to the volume occupied by the structural components, tolerances for spacing the components, membrane thickness, etc. Further, the analysis of the cylindrical vacuum container is highly idealized, and no consideration has been given to the structural aspects, particularly the structure of the outside shell of the cylindrical container which must be made sufficiently strong to avoid the buckling loads that would be imparted thereto.

To discuss other facets of the present invention, it will be noted, with reference to FIG. 3, that the related pair of corner beams 32-32a and 34-34a are aligned with one another at an angle of 45° to the vertical and horizontal axes. It will also be noted that, as discussed previously, the force components exerted on these corner beams 32-32a and 34-34a are also along a line which is approximately 45° to the horizontal and vertical axes. Since the alignment component is at 45°, the spacing between the outermost corner of an outer beam 32 or 34 to the innermost corner point of the inner beam 32a or 34a is at a maximum. Thus, for every unit of the total thickness dimension of a pair of outer and inner panel sections, the maximum spacing from the beam surfaces spaced further from one another is approximately 1.4 times greater. This permits the depth of these beams 32-32a and 34-34a to be maximized in the direction where the greatest force is exerted, thus permitting the structure of the beams to be optimized to withstand the forces.

It will also be noted that where each of the membranes 30 or 30a joins to a related beam, at the juncture point, the alignment of the membrane 30 or 30a relative to the beam, is such that the surface of the beam is tangent to the curvature of the membrane, with the membrane being in a uniform curve. For example, it can be seen that at the juncture point 52 of the membrane 30 to the beam 32 (see FIG. 3) the curved surface portion of the beam 32 is tangent to the membrane 30. The tangent line drawn at the point of contact would make an angle with the general plane occupying the panel section which would be equal to the angle as illustrated in FIG. 1A. Thus, substantially no bending moments are imparted to the membranes 30 or 30a at the location where these membranes joint to a related beam.

The various analyses presented above apply generally to the aforementioned U.S. patent application Ser. No. 821,381 as well as to the present invention. The analysis which follows deals more particularly with certain novel aspects resulting particularly from the novel features of the present application.

Under circumstances where the ambient atmosphere is quite warm and the contained product is at a very low temperature (and also where the opposite condition exists), the problem of thermal expansion exists. It can easily be seen with reference to FIG. 4 that the flexible seal 108 readily permits such thermal expansion. With further reference to FIG. 4, let us now examine how the force loads are reacted in the structure. It can be seen that the pressure of the gaseous medium inside of the container 10 acts upon the rear inner membrane 106 to produce a net rearward force which is reacted into the perimeter frame 100. In like manner, the ambient air pressure against the outer rear membrane 104 produces an opposite force to that exerted on the membrane 106, and this is reacted into the frame 98. The net effect is that these two forces cancel each other out.

To recognize the significance of this, reference is made again to FIG. 1a. It was previously discussed that the tension on the membrane, shown schematically at 62 in FIG. 1a produces a substantial horizontal force which tends to draw the two beams (shown schematically at 60 in FIG. 1a) together. To apply this same principal to the container 10, the membranes 30 act between each set of cross-beams 40-44 to pull these cross-beams toward one another. These tension forces are counteracted by the sections of the longitudinal beams 32 and 34, and also 32a and 34a which are placed in compression.

To continue this analysis further, reference is made back to FIG. 4. As indicated previously, the gaseous pressure forces against the membranes 104 and 106 cancel each other out. There is a net forwardly directed force resulting from ambient air pressure pushing against that perimeter portion of the frame 36, the seal 108 and the frame 98 where there is not a counteracting force exerted from within the container 10. In effect, there is an area, which is approximately proportional to the difference in the area defined by the frame 36 and that defined by the interior part of the frame 100 exposed to pressure within the container 10, and the ambient air pressure exerted on that perimeter area results in a net forward force. This net forward force is resisted by the longitudinal beams 32, and 34.

However, even though the total forces exerted on the beams 32, 32a 34 and 34a can be substantial, it should also be recognized that this particular arrangement of the rear wall 18 does not create any unwanted additional loads on these beams.

Figure 8:
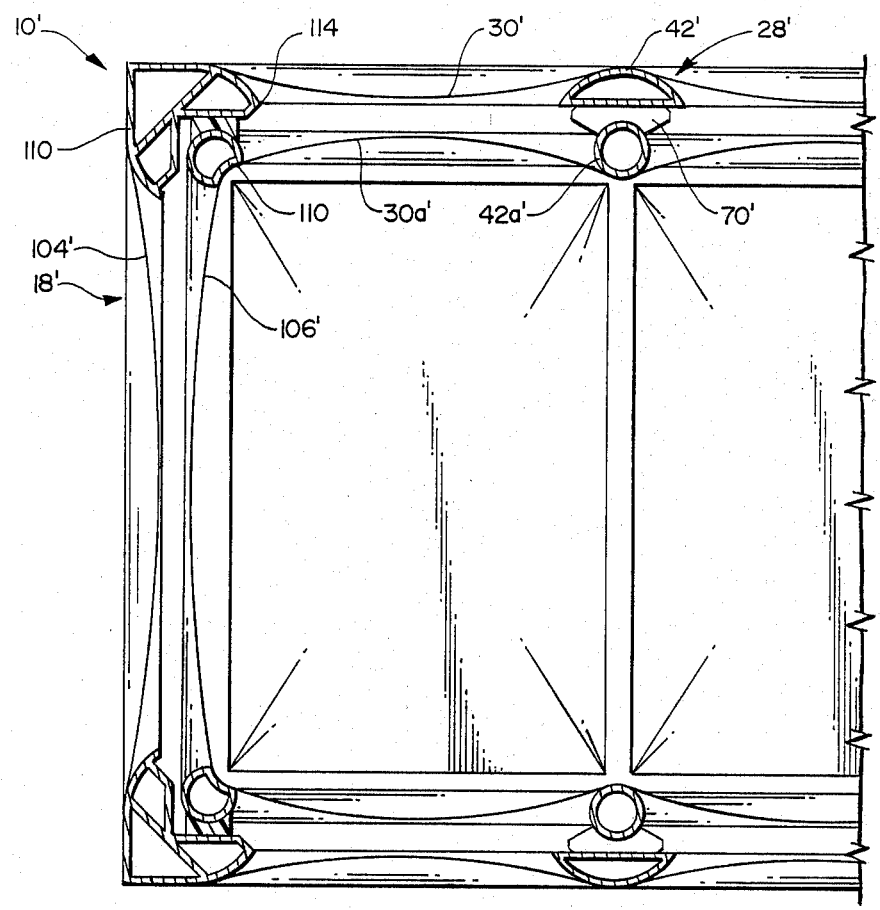
FIG. 8 is a view similar to FIG. 5 showing a second embodiment of the present invention.

A second embodiment of the present invention is illustrated in FIG. 8. The basic structure of this second embodiment is substantially the same as in the first embodiment, except that the rear end portion of the container is modified. Components of this second embodiment which are substantially similar to corresponding components of the first embodiment will be given like numerical designations with a prime (') designation distinguishing those of the second embodiment. Thus, there is a container 10' having a rear end wall 18' comprising an outer membrane 104' and an inner membrane 106'.

There is a rear outer perimeter frame 110, having an overall square configuration, and the outer membrane 104' is mounted to this frame 110 in the manner described previously herein. There is an inner rear perimeter frame 112, also having an overall square configuration, and fitting within the frame 110. The cross-sectional configuration of the frame 110 is somewhat similar to that of the beams 32 and 34, and the cross-sectional configuration of the frame 112 is rather similar to the cross-sectional configuration of the beams 32a and 34a. However, the cross-sectional configuration of these beams could, of course, be modified.

There are insulated spacing elements 114 separating the frames 110 and 112. These spacing elements are shown rather schematically, and each spacing element 114 could, if desired, be similar to the spacing elements 70. The spacing elements 114 are such as to allow limited forward to rear movement of the inner frame 112 relative to the outer frame 110. This permits relatiave movement of the inner and outer structural components due to thermal expansion and contraction.

With regard to the manner in which the structural loads are imparted into the frame, it will be noted that the pressure of the ambient air against the outer membrane 104 will produce a resultant forward force against the outer frame 110. This force will have to be reacted into the longitudinal beams of the outer structure 24'. Thus, in comparison with the first embodiment, for a structure of comparable size, the outer longitudinal beams (numbered 32 and 34 in the first embodiment, but not shown in the second embodiment) will be placed under greater compression loads in the second embodiment.

On the other hand, with the gaseous medium inside the container 10' pressing against the inner rear membrane 106', there is a resultant rearward force exerted on the rear inner frame 112. This in turn is reacted into the the inner longitudinal beams (numbered 32a and 34a in the first embodiment, but not shown in the second embodiment) as tension loads. This tension loading would tend to counteract the compression loading which is caused by the tension for force exerted by the inner membranes 30a'. Thus, embodiment for containers of comparable size and configuration) results in lower net compression loads in the inner longitudinal beams 32a and 34a.

It is to be recognized that various modifications could be made without departing from the basic teaching of the present invention.

TABLE OF AREA RATIOS TO DEFLECTIONS OF MEMBRANE

| | | | | | | | | | | | |
|---|---|---|---|---|---|---|---|---|---|---|---|
| D | 1 | 1 | 2 | 3 | 4 | 5 | 6 | 7 | 8 | 9 | 10 | 6.592 |
| L | 74 | 74 | 74 | 74 | 74 | 74 | 74 | 74 | 74 | 74 | 74 | 74 |
| P | 15 | 15 | 15 | 15 | 15 | 15 | 15 | 15 | 15 | 15 | 15 | 15 |
| RA | 8 | 8 | 8 | 8 | 8 | 8 | 8 | 8 | 8 | 8 | 8 | 8 |
| THETA (@ASIN(L/(2*RM)))*180/@PI | | 3.096 | 6.188 | 9.271 | 12.340 | 15.392 | 18.422 | 21.426 | 24.401 | 27.343 | 30.248 | 20.204 |
| RM ((4*D 2)+L 2)/(8*D) | | 685 | 343 | 230 | 173 | 139 | 117 | 101 | 90 | 81 | 73 | 107 |
| F +P*RM | | 10275 | 5149 | 3445 | 2597 | 2091 | 1756 | 1519 | 1343 | 1208 | 1102 | 1607 |
| W +L+2*RA | | 90 | 90 | 90 | 90 | 90 | 90 | 90 | 90 | 90 | 90 | 90 |
| AO +W 2 | | 8100 | 8100 | 8100 | 8100 | 8100 | 8100 | 8100 | 8100 | 8100 | 8100 | 8100 |
| AI (W−4*D) 2 | | 7396 | 6724 | 6084 | 5476 | 4900 | 4356 | 3844 | 3364 | 2916 | 2500 | 4049 |
| AO/AI +AO/AI | | 1.095 | 1.205 | 1.331 | 1.479 | 1.653 | 1.860 | 2.107 | 2.408 | 2.778 | 3.240 | 2.000 |
| D/L +D/L | | 0.014 | 0.027 | 0.041 | 0.054 | 0.068 | 0.081 | 0.095 | 0.108 | 0.122 | 0.135 | 0.089 |
| CIRCLE | | | | | | | | | | | | |
| AOC/AIC +AOC/AIC | 1.571 | | | | | | | | | | | |
| AO/AIC +AO/AIC | 2 | | | | | | | | | | | |
| AOC @PI*(W/2) 2 | 6361.72 | | | | | | | | | | | |
| AIC (W*@COS(@PI/4)) 2 | 4050 | | | | | | | | | | | |

DEFINITIONS
D DEFLECTION OF MEMBRANE - INCHES
L LENGTH OF ARC OF MEMBRANE - INCHES
P PRESSURE - PSI
RA CORNER BEAM WIDTH - INCHES
THETA ANGLE OF INCIDENCE
RM RADIUS OF MEMBRANE CURVATURE - INCHES
F TENSILE FORCE - POUNDS PER INCH OF WIDTH
W OVERALL WIDTH - INCHES
AO OUTSIDE AREA - SQ IN
AI INSIDE AREA - SQ IN
AO/AI RATIO
D/L RATIO
AOC OUTSIDE AREA CIRCLE - SQ IN
AIC INSIDE AREA CIRCLE - SQ IN

I claim:

1. A vacuum insulated container, defining a containing area and having a longitudinal axis, a front end and a rear end, said container comprising:
   a. a first fluid tight outer side wall structure adapted to be exposed to ambient pressure:
   b. a second fluid tight inner side wall structure spaced inwardly from said outer side wall structure and defining a said containing area;
   c. said first and second outer side wall structure defining therebetween a substantially evacuated insulating area to insulate said containing area from ambient heat transfer;
   d. said outer side wall structure comprising a plurality of side wall sections, each of said side wall sections comprising:
      1. a perimeter frame defining a side wall section area;
      2. a generally planar membrane section extending across said side wall section area and having a main central portion and a perimeter portion attached to said perimeter frame;
      3. the main central portion of the membrane section having a configuration, relative to said perimeter frame, of an inwardly curved plane, such that ambient pressure acting against an outer surface of said membrane section causes said membrane section to react substantially entirely in tension to withstand said ambient pressure; and e. a fluid tight rear end wall section comprising a rear outer wall section and a rear inner wall section which define therebetween a second substantially evacuated area, at least said rear inner wall section being connected to a rear end of the second inner sidewall structure so as to be movable therewith, said rear end of the second inner side wall structure and the rear inner wall section being mounted so as to be movable along said longitudinal axis relative to said outer side wall structure, in a manner that differential thermal expansion and contraction of the first outer side wall structure and the second inner wall structure is permitted through movement of the rear end of the second sidewall structure and the rear inner wall section relative to the first outer side wall structure.

2. The container as recited in claim 1, wherein said rear outer wall section also is connected to the rear end of the second inner side wall structure so as to be movable therewith.

3. The container as recited in claim 2, wherein said rear outer wall section comprises an outer rear perimeter frame which is mounted adjacent to a rear perimeter frame of the first outer side wall structure and which is connected to the perimeter frame of the first outer side wall structure through a fluid tight seal which permits movement of the rear outer perimeter frame of the rear outer wall section relative to the rear perimeter frame of the first outer side wall structure.

4. The container as recited in claim 1, wherein:
a. said rear outer wall section comprises;
   1. a rear outer perimeter frame defining a rear outer wall section area,
   2. a generally planar rear outer membrane section extending across said rear outer wall section area and having a main central portion and a perimeter portion attached to said rear outer perimeter frame,
   3. the main central portion of the outer rear membrane section having a configuration, relative to said rear outer perimeter frame, of an inwardly curved plane, such that ambient pressure acting against an outer surface of said rear outer membrane section causes said rear outer membrane section to react substantially entirely in tension to withstand said ambient pressure; and
b. said rear inner wall section comprising:
   1. a rear inner perimeter frame defining a rear inner wall section area,
   2. a generally planar inner rear membrane section extending across said rear inner perimeter frame area and having a main central portion and a perimeter portion attached to said rear inner perimeter frame,
   3. the main central portion of the rear inner membrane section having a configuration, relative to the rear inner perimeter frame, of an outwardly curved plane in a manner that pressure within said container acting against an inner surface of said rear inner frame section causes said rear inner membrane section to react substantially entirely in tension to withstand said pressure inside the container.

5. The container as recited in claim 1, wherein the rear end of the outer side wall structure comprises a rear perimeter frame, and said rear outer wall section comprises a rear outer membrane section extending across a rear outer wall section area defined by said rear perimeter frame, said rear rear outer membrane section having a main central portion and a perimeter portion attached to the rear perimeter frame of the outer side wall structure, the main central portion of the membrane section having a configuration, relative to said rear perimeter frame, of an inwardly curved plane, such that ambient pressure acting against an outer surface of said rear membrane section causes said membrane section to react substantially entirely in tension to withstand said ambient pressure, said rear inner wall section being movably mounted relative to said outer rear wall section.

6. The container as recited in claim 5, wherein said rear inner wall section comprises:
a. a rear inner perimeter frame defining a rear inner wall section area;
b. a generally planar rear inner membrane section extending across the rear inner wall section area and having a main central portion and perimeter portion attached to said rear inner perimeter frame;
c. the main central portion of the rear inner membrane section having a configuration, relative to said rear inner perimeter frame, of an outwardly curved plane in a manner that pressure within said container acting against an inner surface of said rear inner membrane section causes said rear inner membrane section to react substantially entirely in tension to withstand said pressure inside the container.

7. The container as recited in claim 1, wherein said inner containing structure comprises a plurality of second wall sections, each of said second wall sections comprising:
a. a second perimeter frame defining a second wall section area;
b. a generally planar second membrane section extending across said second wall section area and having a main central portion and a perimeter portion atached to said second perimeter frame;
c. the main central portion of the second membrane section having a configuration, relative to said perimeter frame, of an outwardly curved plane in a manner that pressure within said container acting against an inner surface of said membrane section causes said membrane section to react substantially entirely in tension to withstand said pressure inside the container.

8. The container as recited in claim 7, wherein said rear outer wall section also is connected to the rear end of the second inner side wall structure so as to be movable therewith.

9. The container as recited in claim 8, wherein said rear outer wall section comprises an outer rear perimeter frame which is mounted adjacent to a rear perimeter frame of the first outer side wall structure and which is connected to the perimeter frame of the first outer side wall structure through a fluid tight seal which permits movement of the rear outer perimeter frame of the rear outer wall section relative to the rear perimeter frame of the first outer side wall structure.

10. The container as recited in claim 7, wherein:
a. said rear outer wall section comprises;
   1. a rear outer perimeter frame defining a rear outer wall section area,
   2. a generally planar rear outer membrane section extending across said outer rear outer wall section area and having a main central portion and a perimeter portion attached to said rear outer perimeter frame, 3. the main central portion of the outer rear membrane section having a configuration, relative to said rear outer perimeter frame, of an inwardly curved plane, such that ambient pressure acting against an outer surface of said rear outer membrane section causes said rear outer membrane section to react substantially entirely in tension to withstand said ambient pressure; and b. said rear inner wall section comprising:
 1. a rear inner perimeter frame defining a rear inner wall section area,
 2. a generally planar inner rear membrane section extending across said rear inner perimeter frame area and having a main central portion and a perimeter portion attached to said rear inner perimeter frame,
 3. the main central portion of the rear inner membrane section having a configuration, relative to the rear inner perimeter frame, of an outwardly curved plane in a manner that pressure within said container acting against an inner surface of said rear inner frame section causes said rear inner membrane section to react substantially entirely in tension to withstand said pressure inside the container.

11. The container as recited in claim 2, wherein the rear end of the outer side wall structure comprises a rear perimeter frame, and said rear outer wall section comprises a rear outer membrane section extending across a rear outer wall section area defined by said rear perimeter frame, said rear rear outer membrane section having a main central portion and a perimeter portion attached to the rear perimeter frame of the outer side wall structure, the main central portion of the rear outer membrane section having a configuration, relative to said rear perimeter frame, of an inwardly curved plane, such that ambient pressure acting against an outer surface of said rear membrane section causes said membrane section to react substantially entirely in tension to withstand said ambient pressure, said rear inner wall section being movably mounted relative to said outer rear wall section.

12. The container as recited in claim 11, wherein said rear inner wall section comprises:
a. a rear inner perimeter frame defining a rear inner wall section area;
b. a generally planar rear inner membrane section extending across the rear inner wall section area and having a main central portion and perimeter portion attached to said rear inner perimeter frame;
c. the main central portion of the rear inner membrane section having a configuration, relative to said rear inner perimeter frame, of an outwardly curved plane in a manner that pressure within said container acting against an inner surface of said rear inner membrane section causes said rear inner membrane section to react substantially entirely in tension to withstand said pressure inside the container.

13. A vacuum insulated container, defining a containing area and having a front end, a rear end, a longitudinal axis, a vertical axis, and a transverse axis:
a. a first fluid tight outer side wall structure adapted to be exposed to ambient pressure;
b. a second fluid tight inner side wall structure spaced inwardly from said first outer side wall structure and defining said containing area;
c. said first and second structure defining therebetween a substantially evacuated insulating area to insulate said containing area from ambient heat transfer;
d. said outer containing structure comprising a first support frame, said first support frame comprising:
 1. a plurality of first longitudinally extending corner beams located at edge corner locations of said container;
 2. a plurality of first cross beams extending transversely between adjacent pairs of said first corner beams, with each adjacent pair of first cross beams forming with portions of their said related corner beams a first perimeter frame section;
e. said outer side wall structure further comprising a first membrane means mounted to said first support frame, each first perimeter frame section defining a first related wall section area, with said first membrane means defining a plurality of generally planar first membrane sections, each extending across a related one of said first wall section areas, with each first membrane section having a main central portion and a perimeter portion attached to its said related first perimeter frame section, the main central portion of each first membrane section having a configuration, relative to its said related perimeter frame, of an inwardly curved plane in a manner that ambient pressure acting against an outer surface of said first membrane section causes said first membrane section to react substantially entirely in tension to withstand said ambient pressure;
f. said inner containing structure comprising a second support frame, said second support frame comprising:
 1. a plurality of second longitudinally extending corner beams located at edge corner locations of said container;
 2. a plurality of second cross beams extending transversely between adjacent pairs of said first corner beams, with each adjacent pair of second cross beams forming with portions of their said related corner beams a second perimeter frame section;
g. said inner side wall container structure further comprising a second membrane means mounted to said second support frame, each second perimeter frame section defining a second related wall section area, with said second membrane means defining a plurality of generally planar second membrane sections, each extending across a related one of said second wall section areas, with each second membrane section having a main central portion and a perimeter portion attaching to its said related second perimeter frame, the main central portion of each second membrane section having a configuration, relative to its said related perimeter frame section, of an outwardly curved plane in a manner that pressure within said container acting against an inner surface of said second membrane section causes said second membrane section to react substantially entirely in tension to withstand said ambient pressure; and
h. a fluid tight rear end wall section comprising a rear outer wall section and a rear inner wall section which define therebetween a second substantially evacuated area, at least said rear inner wall section being connected to a rear end of the second inner sidewall structure so as to be movable therewith, said rear end of the second inner side wall structure and the rear inner wall section being mounted so as to be movable along said longitudinal axis relative to said outer side wall structure, in a manner that differential thermal expansion and contraction of the first outer side wall structure and the second inner wall structure is permitted through movement of the rear end of the second sidewall structure and the rear inner wall section relative to the first outer side wall structure.

14. The container as recited in claim 13, wherein each of said second corner beams is positioned adjacent to and inwardly of a related one of said first corner beams.

15. The container as recited in claim 14, wherein said rear outer wall section also is connected to the rear end of the second inner side wall structure so as to be movable therewith.

16. The container as recited in claim 15, wherein said rear outer wall section comprises an outer rear perimeter frame which is mounted adjacent to a rear perimeter frame of the first outer side wall structure and which is connected to the perimeter frame of the first outer side wall structure through a fluid tight seal which permits movement of the outer rear perimeter frame of the rear outer wall section relative to the rear perimeter frame of the first outer side wall structure.

17. The container as recited in claim 14, wherein:
a. said rear outer wall section comprises;
  1. a rear outer perimeter frame defining a rear outer wall section area,
  2. a generally planar rear outer membrane section extending across said rear outer wall section area and having a main central portion and a perimeter portion attached to said rear outer perimeter frame,
  3. the main portion of the outer rear membrane section having a configuration, relative to said rear outer perimeter frame, of an inwardly curved plane, such that ambient pressure acting against an outer surface of said rear outer membrane section causes said rear outer membrane section to react substantially entirely in tension to withstand said ambient pressure; and
b. said rear inner wall section comprising:
  1. a rear inner perimeter frame defining a rear inner wall section area,
  2. a generally planar inner rear membrane section extending across said rear inner perimeter frame area and having a main central portion and a perimeter portion attached to said rear inner perimeter frame,
  3. the main central portion of the rear inner membrane section having a configuration, relative to the rear inner perimeter frame, of an outwardly curved plane in a manner that pressure within said container acting against an inner surface of said rear inner frame section causes said rear inner membrane section to react substantially entirely in tension to withstand said pressure inside the container.

18. The container as recited in claim 14, wherein the rear end of the outer side wall structure comprises a rear perimeter frame, and said rear outer wall section comprises a rear outer membrane section extending across a rear outer wall section area defined by said rear perimeter frame, said rear outer membrane section having a main central portion and a perimeter portion attached to the rear perimeter frame of the outer side wall structure, the main central portion of the rear outer membrane section having a configuration, relative to said rear perimeter frame, of an inwardly curved plane, such that ambient pressure acting against an outer surface of said rear outer membrane section causes said membrane section to react substantially entirely in tension to withstand said ambient pressure, said rear inner wall section being movably mounted relative to said outer rear wall section.

19. The container as recited in claim 18, wherein said rear inner wall section comprises:
a. a rear inner perimeter frame defining a rear inner wall section area;
b. a generally planar rear inner membrane section extending across the rear inner wall section area and having a main central portion and perimeter portion attached to said rear inner perimeter frame;
c. the main central portion of the rear inner membrane section having a configuration, relative to said rear inner perimeter frame, of an outwardly curved plane in a manner that pressure within said container acting against an inner surface of said rear inner membrane section causes said rear inner membrane section to react substantially entirely in tension to withstand said pressure inside the container.

20. The container as recited in claim 13, wherein said rear outer wall section also is connected to the rear end of the second inner side wall structure so as to be movable therewith.

21. The container as recited in claim 20, wherein said rear outer wall section comprises an outer rear perimeter frame which is mounted adjacent to a rear perimeter frame of the first outer side wall structure and which is connected to the perimeter frame of the first outer side wall structure through a fluid tight seal which permits movement of the rear outer perimeter frame of the rear outer wall section relative to the rear perimeter frame of the first outer side wall structure.

22. The container as recited in claim 13, wherein:
a. said rear outer wall section comprises;
  1. a rear outer perimeter frame defining a rear outer wall section area,
  2. a generally planar rear outer membrane section extending across said outer rear outer wall section area and having a main central portion and a perimeter portion attached to said rear outer perimeter frame,
  3. the main central portion of the outer rear membrane section having a configuration, relative to said rear outer perimeter frame, of an inwardly curved plane, such that ambient pressure acting against an outer surface of said rear outer membrane section causes said rear outer membrane section to react substantially entirely in tension to withstand said ambient pressure; and
b. said rear inner wall section comprising:
  1. a rear inner perimeter frame defining a rear inner wall section area,
  2. a generally planar inner rear membrane section extending across said rear inner perimeter frame area and having a main central portion and a perimeter portion attached to said rear inner perimeter frame,
  3. the main central portion of the rear inner membrane section having a configuration, relative to the rear inner perimeter frame, of an outwardly curved plane in a manner that pressure within said container acting against an inner surface of said rear inner frame section causes said rear inner membrane section to react substantially entirely in tension to withstand said pressure inside the container.

23. The container as recited in claim 13, wherein the rear end of the outer side wall structure comprises a rear perimeter frame, and said rear outer wall section comprises a rear outer membrane section extending across a rear outer wall section area defined by said rear outer perimeter frame, said rear outer membrane section having a main central portion and a perimeter portion attached to the rear perimeter frame of the outer side wall structure, the main central portion of the membrane section having a configuration, relative to said rear perimeter frame, of an inwardly curved plane, such that ambient pressure acting against an outer surface of said rear outer membrane section causes said membrane section to react substantially entirely in tension to withstand said ambient pressure, said rear inner wall section being movably mounted relative to said outer rear wall section.

24. The container as recited in claim 23, wherein said rear inner wall section comprises:
   a. a rear inner perimeter frame defining a rear inner wall section area;
   b. a generally planar rear inner membrane section extending across the rear inner wall section area and having a main central portion and perimeter portion attached to said rear inner perimeter frame;
   c. the main central portion of the rear inner membrane section having a configuration, relative to said rear inner perimeter frame, of an outwardly curved plane in a manner that pressure within said container acting against an inner surface of said rear inner membrane section causes said rear inner membrane section to react substantially entirely in tension to withstand said pressure inside the container.

25. A vacuum insulated container, defining a containing area and having a longitudinal axis, a front end and a rear end, said container comprising:
   a. a first fluid tight outer side wall structure adapted to be exposed to ambient pressure;
   b. a second tight inner side wall structure spaced inwardly from said outer side wall structure and defining said containing area;
   c. said first and second outer side wall structures defining therebetween a substantially evacuated insulating area to insulate said containing area from ambient heat transfer;
   d. a fluid tight rear end wall section comprising a rear outer wall section and a rear inner wall section which define therebetween a second substantially evacuated area, said rear inner wall section and said rear outer wall section being connected to a rear end of the second inner side wall structure so as to be movable therewith, the rear end of the second inner side wall structure and the rear inner and outer wall sections being mounted so as to be movable along said longitudinal axis relative to said outer side wall structure, in a manner that differential thermal expansion and contraction of the first outer side wall structure and the second inner side wall structure is permitted through movement of the rear end of the second side wall structure and the rear inner and outer wall sections relative to the first outer side wall structure;
   e. said rear outer wall section comprising a rear outer perimeter frame which is mounted adjacent to a rear perimeter frame of the first outer side wall structure and which is connected to the perimeter frame of the first outer side wall structure through a fluid tight seal which permits movement of the rear outer perimeter frame of the rear outer wall section relative to the rear perimeter frame of the first outer side wall structure. said rear outer perimeter frame, of an inwardly curved plane, such that ambient pressure acting against an outer surface of said rear outer membrane section causes said rear outer membrane section to react substantially entirely in tension to withstand said ambient pressure; and
   b. a rear inner wall section comprising;
      1. a rear inner perimeter frame defining a rear inner wall section area,
      2. a generally planar rear inner membrane section extending across said rear inner perimeter frame area and having a main central portion and perimeter portion attached to said rear inner perimeter frame,
      3. the main central portion of the rear inner membrane section having a configuration, relative to the rear inner perimeter frame, of an outwardly curved plane in a manner that pressure within said container acting against an inner surface of said rear inner frame section causes said rear inner membrane sections to react substantially entirely in tension to withstand said pressure inside the container.

26. The container as recited in claim 25, wherein:
   a. said rear outer wall section additionally comprises:
      1. a generally planar rear outer membrane section extending across said rear outer wall section area and having a main central portion and a perimeter portion attached to said rear outer perimeter frame,
      2. the main central portion of the rear outer membrane section having a configuration, relative to said rear outer perimeter frame, of an inwardly curved plane, such that ambient pressure acting against an outer surface of said rear outer membrane section causes said rear outer membrane section to react substantially entirely in tension to withstand said ambient pressure; and
   b. said rear inner wall section comprising:
      1. a rear inner perimeter frame defining a rear inner wall section area,
      2. a generally planar rear inner membrane section extending across said rear inner perimeter frame area and having a main rear inner perimeter frame,
      3. the main central portion of the rear inner membrane section having a configuration, relative to the rear inner perimeter frame, of an outwardly curved plane in a manner that pressure within said container acting against an inner surface of said rear inner frame section causes said rear inner membrane section to react substantially inside the container.

* * * * *